Dec. 6, 1949 — L. A. LEHRMAN — 2,490,738
SNUBBER
Filed June 15, 1945 — 2 Sheets-Sheet 1
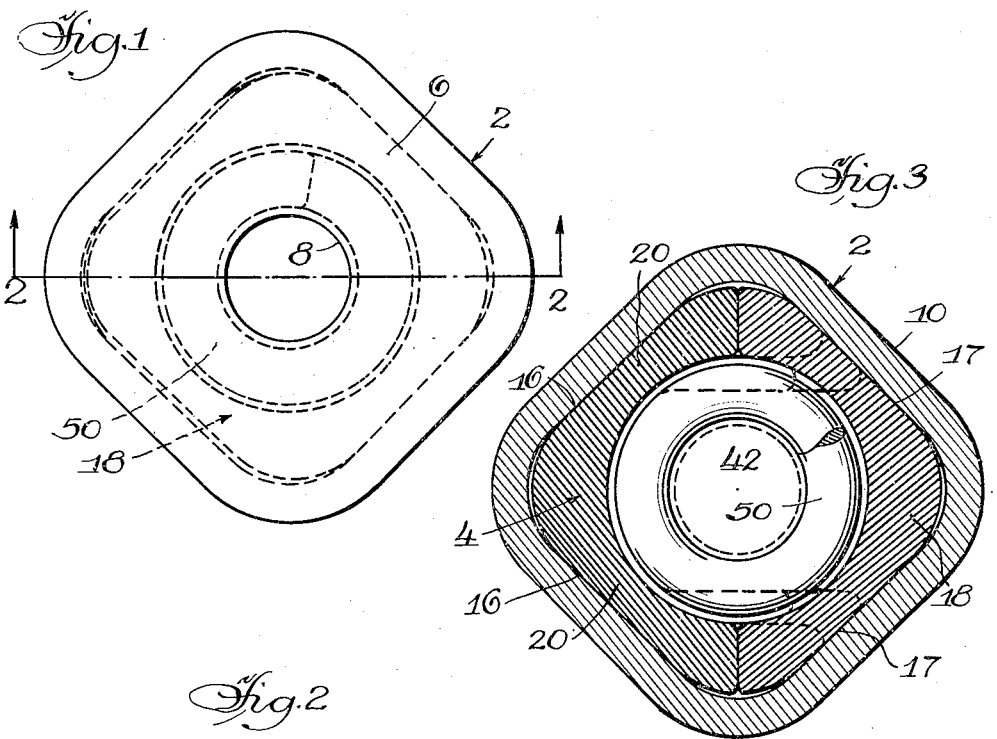
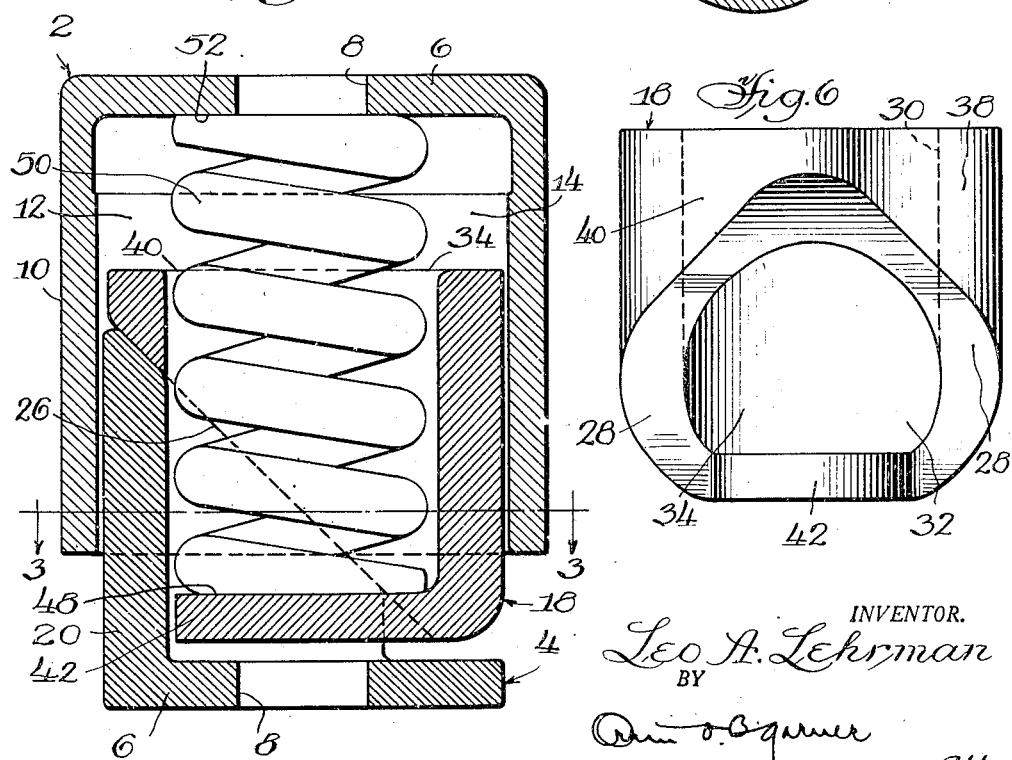
INVENTOR.
Leo A. Lehrman
BY
Atty.

Dec. 6, 1949 L. A. LEHRMAN 2,490,738
SNUBBER
Filed June 15, 1945 2 Sheets-Sheet 2
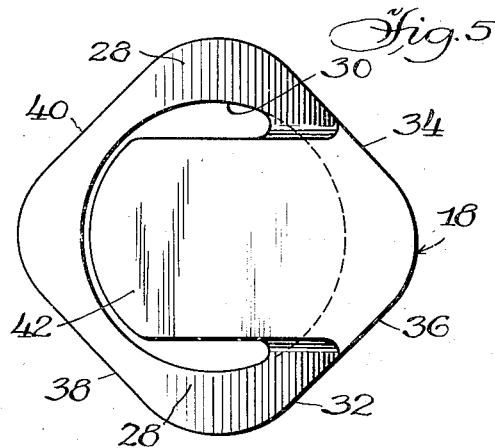
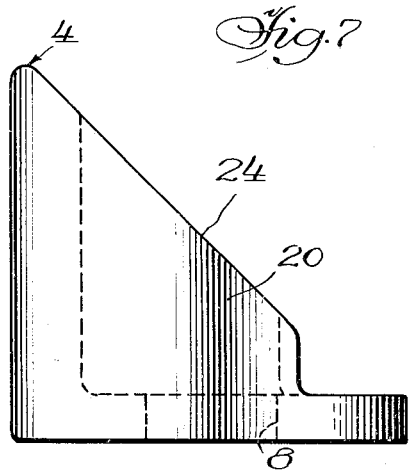
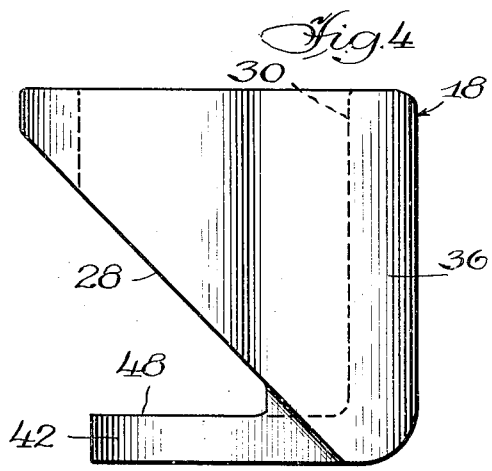
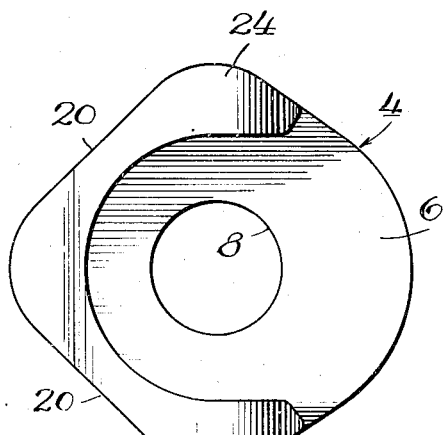
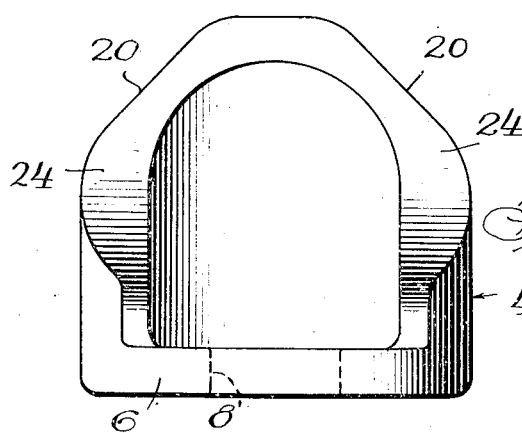
INVENTOR.
Leo A. Lehrman,
BY
Atty Patented Dec. 6, 1949

2,490,738

UNITED STATES PATENT OFFICE 2,490,738

SNUBBER

Leo A. Lehrman, Chicago, Ill., assignor to American Steel Foundries, Chicago, Ill., a corporation of New Jersey Application June 15, 1945, Serial No. 599,544

6 Claims. (Cl. 267—9)

My invention relates to friction devices and more particularly to a snubber adapted to be associated with a plurality of springs disposed between relatively movable members for dampening synchronous oscillations of the springs, although it may be used elsewhere if so desired.

The general object of my invention is to design a relatively compact snubber having a minimum number of parts which may be economically manufactured and will have long life in service.

A specific object of my invention is to design a novel snubber comprising a pair of followers having frictional engagement with each other, a friction shoe in frictional engagement with one of said followers and in wedge engagement with the other follower, and resilient means operatively urging said followers and shoe into said engagements.

A further object of my invention is to provide a snubber comprising a friction follower having spaced V-shaped surfaces, another friction follower and a shoe having complementary engagement with respective surfaces and wedge engagement with each other, and resilient means compressed between said shoe and one of said followers for urging the shoe and followers into said engagements.

Another object of my invention is to design a snubber comprising a friction follower in telescopic relationship with a shoe and another follower and having spaced friction surfaces in engagement with the same, said shoe and said last-mentioned follower having spaced wedge surfaces in complementary engagement with each other, and resilient means extending between the wedge surfaces and bearing against said shoe and said first-mentioned follower for urging the shoe into frictional engagement with each follower.

In the drawings,

Figure 1 is a top plan view of a snubber embodying my invention.

Figure 2 is a sectional view of the same, taken in the vertical plane bisecting the device through its vertical axis, as indicated by the line 2—2 of Figure 1.

Figure 3 is a sectional view taken in the horizontal plane indicated by the line 3—3 of Figure 2.

Figure 4 is a side elevation of the friction shoe, Figure 5 is a bottom view of the same, and Figure 6 is a view taken from the left as seen in Figure 4.

Figure 7 is a side elevation of the bottom follower, Figure 8 is a top plan view of the same, and Figure 9 is a view looking from the right of Figure 7.

Describing my invention in detail, my novel snubber comprises the top and bottom followers generally designated 2 and 4, each having a base or horizontal wall 6 adapted to seat respectively against supported and supporting relatively movable members and provided with a central opening 8 adapted for the reception of positioning means on the associated supporting and supported members.

The top follower 2 also comprises a friction housing or barrel 10 formed on the inner face of the associated wall 6 and projecting angularly therefrom, said barrel being substantially square in horizontal cross section, as clearly seen in Figure 3, and having inner V-shaped friction surfaces 12 and 14, said surface 12 being in complementary frictional engagement as at 16, 16 with the bottom follower 4 and said surface 14 being in complementary frictional engagement as at 17, 17 with a shoe generally designated 18, respectively, said shoe 18 and follower 4 being hereinafter more fully described.

Extending upwardly from the horizontal wall 6 of the bottom follower 4 are the vertical walls 20, said walls being substantially V-shaped in horizontal cross section as clearly seen in Figures 3 and 8 with the outer diagonally disposed surfaces thereof in complementary engagement as at 16, 16 with the friction surface 12 of the barrel 10, each of said walls 20 being formed with a diagonal wedge surface 24, said surfaces being substantially coplanar and extending across the vertical axis of the device, as clearly seen in Figures 2 and 7, for complementary engagement as at 26 with spaced diagonal surfaces 28 on the friction shoe 18.

Referring now to Figures 4, 5 and 6, the friction shoe 18 there shown is a cuplike structure received within the friction barrel 10 and formed substantially square in top plan, said shoe comprising an annular opening 30 partially defined by the vertical friction walls 32 and 34 having a V-shaped friction face 36 in complementary engagement as at 17, 17 with the surface 14 of the friction barrel 10, said opening being also defined by vertical friction walls 38 and 40, said walls 32 and 38 having the diagonal wedge surface 28 coplanar with a similar surface 28 on the walls 34 and 40, said surfaces having engagement with the wedge surfaces 24, 24 on the bottom follower 4.

Projecting from the walls 32 and 34 of the shoe 18 between the wedge surfaces 28 thereof and extending between the walls 20, 20 of the bottom follower 4 is a horizontal wall 42 affording a spring seat as at 48 for one end of the coil spring 50, the opposite end of said spring being seated as at 52 against the wall 6 of the follower 2, said spring being housed within the friction shoe 18 and the bottom follower 4, as clearly seen in Figure 2.

In the operation of the device, it will be apparent that contraction of the same will cause compression of the spring 50 which will operatively urge the shoe 18 laterally and downwardly along the diagonal surfaces 24 of the bottom follower into frictional engagement with the friction surface 14 of the top follower 2, while the bottom follower will be urged by the action of the shoe into frictional engagement with the friction surface 12 of the top follower 2.

It will be apparent from the foregoing description that my novel snubber is relatively compact in design, is composed of a minimum number of parts which may be economically manufactured and readily assembled, and will have a long life in service.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction device, a follower comprising a substantially square housing having opposed internal V-shaped friction surfaces, a wedge follower comprising a base and walls arranged in a V extending from said base into said housing and engaging one of said V-shaped surfaces, a continuous substantially flat wedge face on the edges of said walls remote from said base extending transversely of said housing diagonally with respect to said surfaces, a shoe comprising four walls arranged substantially in a square, two of the walls of the shoe engaging the other of said surfaces, a spring seat connected to the last-mentioned two walls and extending substantially parallel to said base between the walls of said wedge follower, a continuous wedge face on the edges of said shoe walls facing said spring seat in complementary engagement with the first-mentioned wedge face, and a spring extending within said shoe between said faces and compressed between said seat and said first-mentioned follower.

2. A friction snubber comprising a housing follower having an internal spring seat and having opposed internal friction surfaces at opposite sides of the longitudinal axis of the housing, a friction shoe having a friction wall engaged with one of the surfaces at one side of said axis, an integral spring seat formed on the end of said wall remote from the follower seat and extending generally parallel thereto across said axis, a wedge follower having a friction wall engaging the other surface at the opposite side of said axis, engaged wedge faces on the wedge follower and shoe respectively, said faces extending diagonally with respect to said surfaces from the inner end of the follower wall to the outer end of the shoe wall, a base integrally formed on the outer end of the follower wall and extending across said axis generally parallel to said seats, the shoe seat being spaced from the follower wall and base and from the housing follower to accommodate relative tilting between the followers, and a spring engaged with and compressible between the seats.

3. A friction snubber comprising a housing with an internal spring seat, a friction shoe having a friction wall within and engaging the housing, a wedge follower having a friction wall diametrically opposed to the shoe wall and engaging the interior of the housing, wedge faces on the shoe and follower respectively extending from the inner end of one wall to the outer end of the other wall, said walls having their outer ends formed respectively with spaced members generally parallel to the spring seat, the shoe member being spaced from the follower and housing to accommodate tilting therebetween, and a spring compressible between the seat and shoe member, and surfaces on the remote sides of the housing and follower member adapted to seat associated relatively movable parts.

4. A friction snubber comprising a housing with an internal spring seat arranged transversely of the longitudinal axis of said housing, a pair of friction surfaces within said housing disposed respectively at opposite sides of said axis, a friction shoe having a wall engaged with one of said surfaces, an integral spring seat formed on the end of said wall remote from said housing seat and extending generally parallel thereto, a spring bearing against and compressible between said seats, a wedge follower comprising a wall engaging the other surface, and a wedge face on said shoe extending almost completely around said spring and sloping outwardly of said housing toward said one surface at an acute angle with respect thereto and engaging a complementary face on the wall of said follower, said shoe spring seat being spaced from said follower and said housing to accommodate relative canting movement between said housing and said follower.

5. In a friction device, a top follower comprising a base and a substantially square friction housing extending downwardly from said base and comprising opposed internal V-shaped surfaces, a hollow shoe substantially square in horizontal cross-section telescoped within said housing, an integral spring seat at the lower end of said shoe, a spring extending into said shoe and compressed directly between said seat and said base, and a bottom follower extending into said housing and in complementary engagement with one of said surfaces, said shoe having diagonal face engagement with the upper end of said bottom follower at one side of the axis of said spring and complementally engaging the other of said surfaces at the opposite side of the axis of said spring.

6. A friction device comprising a housing with an internal spring seat and having opposed internal surfaces disposed respectively at opposite sides of the longitudinal axis of said housing, a friction shoe having a wall engaged with one of said surfaces at one side of said axis, an integral spring seat formed on one end of said wall remote from said housing seat and extending generally parallel thereto across said axis, a spring bearing against and compressible between said seats, a follower having a wall engaging the other surface at the opposite side of said axis, and a wedge surface on said shoe extending lengthwise around said spring and sloping away from said housing seat toward said one surface at an acute angle with respect thereto and engaging a complementary wedge face on said follower, the principal area of engagement between said faces occurring at said last-mentioned side of said axis, said shoe wedge face extending beyond said follower wedge face adjacent said one surface and said shoe spring seat being spaced from said housing and said follower to accommodate relative tilting between said housing and follower.

LEO A. LEHRMAN.

REFERENCES CITED

The following references are of record in the file of this patent:

UNITED STATES PATENTS

| Number | Name | Date |
|---|---|---|
| 736,724 | Handiges | Aug. 18, 1903 |
| 1,008,670 | O'Connor | Nov. 14, 1911 |
| 1,136,022 | McCormick | Apr. 20, 1915 |
| 1,169,862 | Peycke | Feb. 1, 1916 |
| 2,198,261 | Barrows et al. | Apr. 23, 1940 |
| 2,379,078 | Haseltine | June 26, 1945 |

FOREIGN PATENTS

| Number | Country | Date |
|---|---|---|
| 552,698 | Germany | June 17, 1932 |